United States Patent [19]

Dalton, Jr. et al.

[11] 4,335,092

[45] Jun. 15, 1982

[54] SYNTHESIS OF HYDROGEN PEROXIDE

[75] Inventors: Augustine I. Dalton, Jr.; Ronald W. Skinner, both of Allentown, Pa.

[73] Assignee: Air Products and Chemicals, Inc., Allentown, Pa.

[21] Appl. No.: 195,827

[22] Filed: Oct. 10, 1980

[51] Int. Cl.$^3$ ............................................. C01B 15/02
[52] U.S. Cl. ..................................................... 423/584
[58] Field of Search ......................................... 423/584

[56] References Cited

U.S. PATENT DOCUMENTS

| | | | |
|---|---|---|---|
| 3,336,112 | 8/1967 | Hooper | 423/584 |
| 3,361,533 | 1/1968 | Hooper | 423/584 |
| 3,433,582 | 3/1969 | Campbell | 423/584 |
| 4,007,256 | 2/1977 | Kim et al. | 423/584 |
| 4,009,252 | 2/1977 | Izumi et al. | 423/584 |

FOREIGN PATENT DOCUMENTS 284210  1/1966  Australia .............................. 423/584

*Primary Examiner*—O. R. Vertiz
*Assistant Examiner*—Wayne A. Langel
*Attorney, Agent, or Firm*—James C. Simmons; E. Eugene Innis

[57] ABSTRACT

Hydrogen peroxide is synthesized by contacting hydrogen and oxygen with a supported palladium catalyst in the presence of methanol. Preferably, the methanol contains up to 1.0% by weight of formaldehyde and is at least 0.0001 N in hydrochloric acid.

9 Claims, No Drawings

SYNTHESIS OF HYDROGEN PEROXIDE

BACKGROUND OF THE INVENTION

1. Field of the Invention

This invention relates to synthesis of hydrogen peroxide from its constituent elements, hydrogen and oxygen, and more particularly to the use of methanol as the medium in which the synthesis takes place.

2. Prior Art

The synthesis of hydrogen peroxide directly from its constituent elements has conventionally been carried out in essentially aqueous solvent systems.

It has been proposed by Hooper, in U.S. Pat. No. 3,361,533, that hydrogen peroxide synthesis using a supported metal catalyst in an aqueous medium containing an acid is enhanced by inclusion of an oxygen-containing organic solvent, such as alcohols, aldehydes, ketones, ethers, ester, amides and oxygen-containing amines in the aqueous medium. The preferred medium is 75:25 acetone:water by volume. However, acetone as the sole reaction medium was said to result in the formation of no peroxide at all. A medium of 75:25 isopropanol:water produced an explosive reaction. It is, therefore, clearly apparent that the nature of the reaction medium profoundly influences the course of the reaction and that significant amounts of water are required for an effective reaction.

In U.S. Pat. No. 3,336,112, Hooper has proposed inclusion of a sequestrative stabilizer in an aqueous medium for direct hydrogen peroxide synthesis from the elements using a supported Group I or Group VIII metal catalyst.

It has been proposed by Campbell in U.S. Pat. No. 3,433,582, that hydrogen peroxide can be synthesized directly from hydrogen and oxygen by contacting a solid catalyst in a liquid medium containing water and dissolved boric acid.

It has further been proposed by Kim et al, in U.S. Pat. No. 4,007,256, that hydrogen peroxide is produced by contacting hydrogen and oxygen with a supported catalyst in the presence of water, an organic nitrogen-containing compound and a strong acid.

It has further been proposed by Izumi et al, in U.S. Pat. No. 4,009,252, that use of an entirely aqueous acid solvent for synthesis of hydrogen peroxide using a palladium catalyst prevents the formation or accumulation of organic peroxides. However, the process requires the use of high hydrogen and oxygen pressures, which can be hazardous, and is limited by the low solubility of hydrogen and oxygen in all-aqueous systems, which results in undesirably low hydrogen peroxide formation. The process is therefore unattractive from a commercial viewpoint.

SUMMARY OF THE INVENTION

In accordance with the present invention, hydrogen peroxide is prepared by contacting hydrogen and oxygen with a supported palladium catalyst in the presence of a liquid medium comprising methanol. The liquid medium preferably contains up to 1.0% by weight of formaldehyde and is at least 0.0001 N in hydrochloric acid or sulfuric acid.

The process of the invention has the following advantages:

1. Higher reaction rates are observed than in an aqueous solvent under the same conditions, owing in part to higher hydrogen and oxygen solubility in methanol.

2. High selectivities are obtained in the methanol solvent, without the need for resorting to catalyst concentration limitations.

3. Methanol is essentially inert to hydrogen peroxide.

4. The organic inhibitor, formaldehyde, is required only in low concentrations. This prevents equilibrium-controlled accumulation of organic peroxides, which are unsafe and difficult to remove and which are catalyst poisons.

5. Palladium catalyst losses are reduced because palladium salts, formed by reaction of the catalyst with hydrochloric acid, are less soluble in methanol than in water.

6. Product isolation by distillation is facilitated since the boiling point and heat of vaporization of methanol are lower than those of water.

DETAILED DESCRIPTION

Experiments in the prior art solvent system, acetone-water, indicated that catalyst loss by solubilization were decreased and yields of hydrogen peroxide were increased using a palladium on carbon catalyst rather than palladium on silica gel. It was found that changing the reaction medium to methanol in a batch process both markedly reduced loss of palladium by solubilization and gave improved yields of hydrogen peroxide. The successful use of methanol as a reaction solvent was highly unexpected in view of our findings that hydrogen peroxide is very unstable to palladium-catalyzed decomposition in a methanolic medium, so that accumulation of high levels of hydrogen peroxide in methanol would not be expected.

A further problem encountered using acetone and many other organic solvent is the formation of peroxides, which are hazardous to handle and which tend to deactivate the catalyst. Methanol, owing to its inertness to hydrogen peroxide, does not form peroxides.

An additional advantage of methanol as solvent is that the reaction rate in methanol is higher than for known solvent systems. This effect is attributed to higher solubility of hydrogen and oxygen in methanol than in other solvent systems.

It has been found that methanol is superior to other alcohols, e.g. isopropanol or tert-butanol and that essentially anhydrous methanol is superior as a solvent to methanol containing greater than about 25% by volume of water. Most preferably, only traces of water produced by side or competing reactions or added with the reagents will be present.

A problem in the art of making hydrogen peroxide is that hydrogen peroxide is decomposed by palladium catalysts. It has been found that addition of formaldehyde to methanolic solutions of hydrogen peroxide inhibits this decomposition substantially. Particularly good results are obtained in anhydrous methanol, in which addition of up to 1.0% by weight of formaldehyde essentially stops the decomposition. Use of formaldehyde concentrations of this order precludes the formation of significant amounts of organic peroxides, which could become troublesome if high concentrations of an organic inhibitor were required.

It would be expected that inclusion of any acid at least as strong as acetic acid, e.g., sulfuric acid, hydrobromic acid, orthophosphoric acid or sulfonic acids, in the reaction medium would be effective for suppressing ionization of $H_2O_2$ to the peroxyanion, the intermediate through which the peroxide rapidly decomposes according to the equation:

$$HOOH \rightleftharpoons H^+ + HOO^-$$

However, hydrochloric acid has been found to be particularly effective in inhibiting peroxide decomposition in a methanolic medium. The methanolic medium employed for the reaction will therefore generally be at least 0.0001 N in hydrochloric acid. It may contain sulfuric acid as well as trace amounts of sodium meta- and/or pyrophosphates. Preferably, the medium will contain both acids as a stabilizer combination as well as a phosphate stabilizer.

It has been found that the prior art process run continuously using 75% acetone-25% water resulted in significantly less catalyst deactivation than the batch process. It is apparent, from the long runs and high yields of hydrogen peroxide and high selectivity in continuous reactions in methanol solvent systems that catalyst deactivation is markedly lower in methanol than in aqueous acetone. It is thought that low solubility of palladium salts in methanol may account for this.

The synthesis of $H_2O_2$ in accordance with the invention can be carried out in batch or continuous mode, but the continuous process is preferred.

A further advantage of the present invention is that the reaction can be carried out at oxygen/hydrogen ratios of 23–30, which are outside the limits of flammability and explosion hazard, and in the presence of an excess of noble metal catalyst. A rate of 1.07 moles hydrogen peroxide/l.-hr-atm. hydrogen, which is mass transfer limited, has been realized under continuous reaction conditions using high gas flow (3.92 scfh for hydrogen and 117.41 scfh for oxygen), with high selectivity (87%).

It is proposed that employing essentially anhydrous methanol as the reaction solvent permits the use of high oxygen/hydrogen ratios because hydrogen is considerably more soluble in methanol than in aqueous media.

Without further elaboration, it is believed that one skilled in the art can, using the preceding description, utilize the present invention to its fullest extent. The following specific embodiments are, therefore, to be construed as merely illustrate and not limitative of the remainder of the disclosure in any way whatsoever. In the following Examples, the temperatures are set forth uncorrected in degrees Celsius. Unless otherwise indicated, all parts and percentages are by weight.

EXAMPLE 1

Two grams of 5% palladium on carbon were charged to a stirred "Glass Batch" reactor containing 275 ml of 75% acetone-25% water by volume which was 0.1 N sulfuric acid and 0.01 N hydrochloric acid, and contained 100 ppm of each of sodium meta- and pyrophosphates. After cooling to 0° C., hydrogen and oxygen were sparged through the solvent and catalyst at 0.6 scfh and 2.05 scfh, respectively, at a pressure of 125 psig. The concentrations of hydrogen peroxide accumulated and dissolved or soluble catalyst were determined as a function of time by titration with a standardized solution of potassium permanganate and atomic absorption spectroscopy, respectively.

The following results were obtained.

| Elapsed Time, hrs | $H_2O_2$ Conc., M | Solubilized Pd | |
|---|---|---|---|
| | | μg/cc | % of Charged Catalyst |
| 0.25 | 0.282 | 24.48 | 6.73 |
| 0.50 | 0.426 | 23.28 | 6.33 |
| 1.00 | 0.647 | 19.42 | 5.22 |
| 1.50 | 0.855 | 7.22 | 1.90 |
| 2.00 | 0.952 | 5.73 | 1.48 |
| 3.00 | 1.25 | 3.40 | 0.88 |
| 4.00 | 1.25 | 2.76 | 0.70 |

The catalyst had produced 364 moles of hydrogen peroxide/mole of palladium after 3 hours at which point catalyst deactivation was essentially complete.

EXAMPLE 2

Using 5% palladium on silica gel catalyst, the experiment described in Example 1 was repeated, with the following results:

| Elapsed Time, hrs. | $H_2O_2$ Conc., M | Solubilized Pd | |
|---|---|---|---|
| | | g/cc | % of Charged Catalyst |
| 0.17 | 0.08 | 29.67 | 8.16 |
| 1.00 | 0.27 | 62.25 | 17.12 |
| 5.50 | 0.73 | 65.89 | 18.12 |

These experiments indicate that higher yields of hydrogen peroxide are obtained with less loss of palladium catalyst by dissolution, using a palladium on carbon catalyst rather than palladium supported on silica gel, a preferred catalyst of Hooper, U.S. Pat. No. 3,336,112.

EXAMPLE 3

The experiment described in Example 1 was repeated, except that the reaction was allowed to continue for a longer time and that the concentration of hydrolyzable organic peroxides, expressed as hydrogen peroxide, was determined by titration with a standardized solution of potassium permanganate.

Results obtained were:

| Elapsed Time, hrs. | $H_2O_2$ Conc., M | Conc. Organic Peroxides, M |
|---|---|---|
| 1 | 0.40 | |
| 2 | 0.8 | |
| 3 | 1.1 | |
| 4 | 1.3 | 0.20 |
| 5 | 1.5 | 0.24 |
| 6 | 1.5 | 0.26 |

These data indicate that accumulation of peroxides becomes significant in aqueous acetone after long reaction periods and that hydrogen peroxide yield also levels off.

EXAMPLE 4

A continuous reactor for the preparation of hydrogen peroxide from hydrogen and oxygen consisted of a vertical tube packed with palladium on carbon catalyst and equipped for upward concurrent inflow of hydrogen, oxygen and solvent. Each of the inflow systems was equipped with metering means and a source of hydrogen, oxygen or solvent. The reactor was a pipe 5 feet in length and 1.28 inches in inner diameter, lined with polytetrafluoroethylene and jacketed to permit circulation of a cooling medium. At the top of the reactor, which was equipped with a blow-out disc, was a device for removal of liquid samples, means for transferring the reactor effluent to a liquid-gas separator and means for introducing a diluent stream of nitrogen. The gas separated in the liquid-gas separator was vented and the liquid effluent retained. Analysis for hydrogen peroxide was done as in Example 1.

A. 80% acetone-20% water by volume as solvent

The reactor was packed with 200 gms of 0.2% palladium on carbon catalyst. A solvent consisting of 80% acetone-20% water, which was 0.1 N in sulfuric acid and 0.01 N in hydrochloric acid and contained 100 ppm of each of sodium and meta- and pyrophosphates, was passed up through the catalyst bed at the rate of 0.883 L/hr (1.6 LHSV). Hydrogen and oxygen were introduced at 1.61 and 4.61 scfh, respectively. The pressure was 150 psig and the temperature 27° C. After 4 hours, the hydrogen peroxide concentration in the effluent was 0.57 molar, which corresponds to a rate of accumulation of peroxide of 1.2 mol hydrogen peroxide/gm palladium/hr at 40% selectivity. Selectivity is $$100\% \times \frac{\text{moles/hr } H_2O_2 \text{ leaving reactor}}{\text{moles/hr } H_2O_2 \text{ consumed}}$$

After 100 hours, 9400 moles hydrogen peroxide had been produced per mole of palladium and the catalyst had lost 30% of its initial activity.

The concentration of organic peroxide varied from 0.01 to 0.03 M during the first 72 hours of the run.

In similar experiments copious precipitates of explosive organic peroxides formed upon evaporation of acetone in vacuo.

B. Alcohols as solvents

The reactor was packed with a homogeneous blend of 363 g of 0.2% palladium on carbon catalyst and 121 g of carbon black. Solvent mixtures which were 0.025 N in sulfuric acid and 0.0013 N is hydrochloric acid and contained 100 ppm of each of sodium meta- and pyrophosphates, were used. The temperature was kept at 7° C. Hydrogen was added at a rate of 1.67 scfh and oxygen at a rate of 26.84 scfh (1:16 ratio) and 150 psig. The following results were obtained:

| Solvent Composition (by volume) | Solvent Pump Rate/L/hr | Performance | | | |
|---|---|---|---|---|---|
| | | Time hrs. | $H_2O_2$ Molar | $H_2$ Selec. % | Mol/ mol Pd-hr |
| Methanol | 0.838 | 24 | 0.369 | 73.3 | 45.32 |
| 80% MeOH-20% Water | 0.838 | 61.21 | 0.191 | 48.5 | 23.46 |
| 80% isopropanol-20% water (a) | 1.731 | 76.21 | 0.05 | 84.11 | 12.68 |
| 80% t-BuOH-20% water (b) | 1.616 | 83.5 | 0.027 | 44.1 | 6.40 |

(a) Containing 0.1% by weight of formaldehyde
(b) 0.05 N in sulfuric acid and 0.0025 in hydrochloric acid.

These data indicate that highest yields of hydrogen peroxide were realized in anhydrous methanol.

EXAMPLE 5

Stability toward palladium-catalyzed decomposition of hydrogen peroxide solutions 0.1 N in sulfuric acid and 0.01 N in hydrochloric acid was investigated at the temperatures indicated below, at an initial concentration of about 1.5 M hydrogen peroxide. The amount of % palladium on carbon was 2 g per 275 ml of solution. The decomposition was followed by titration with potassium permanganate. The following results were obtained:

| Run | Solvent (volume) MeOH | $H_2O$ | Formaldehyde Conc., Wt. % | T, °C. | Decomposition | | | |
|---|---|---|---|---|---|---|---|---|
| | | | | | 1 hr | 2 hr | 3 hr | 4 hr |
| A | 75 | 25 | 0 | 27.7 | 70[a] | | | |
| B | 75 | 25 | 0.2 | 0 | 7.2 | 8.8 | 11 | 13.8 |
| C | 75 | 25 | 0.4 | 0 | 7.0 | 9.2 | 13.5 | 14.6 |
| D | 100 | 0 | 0.2 | 0 | 1.8 | 4.2 | 5.5 | |

[a] After 15 minutes.

Essentially complete decomposition of hydrogen peroxide in methanolic media within a few minutes indicates that no stabilization of $H_2O_2$ occurs in this medium. It is accordingly surprising that methanol can be used successfully as a medium for the synthesis of $H_2O_2$.

These data further indicate that addition of minor amounts of formaldehyde improves the stability of hydrogen peroxide solutions toward palladium-catalyzed decomposition.

EXAMPLE 6

The reactor described in Example 4 was charged with 480 g. of 0.5% palladium on carbon catalyst. The solvent employed contained 0.1% by weight of formaldehyde, 100 ppm of each of sodium meta- and pyrophosphates and was 0.025 N in sulfuric acid and 0.0013 N in hydrochloric acid. The temperature was maintained at 0° C. and the gas pressure at 400 psig. Results were:

| Gas Flow | | | Solvent | | | Performance | | | |
|---|---|---|---|---|---|---|---|---|---|
| $H_2$ scfh | $O_2$ scfh | $O_2/H_2$ | Solvent Composition | Pump Rate, L/hr | Time Hours | $H_2O_2$ Molar | $H_2$ Selec., % | mol/ mol Pd-hr | mol/ft³-hr-psi $H_2$ |
| 1.52 | 34.47 | 23 | MeOH | 1.74 | 3 | 0.457 | 71 | 35.3 | 1.12 |
| 1.52 | 34.47 | 23 | MeOH | 1.74 | 11 | 0.490 | 86.9 | 37.8 | 1.20 |
| 1.52 | 34.47 | 23 | 90% MeOH-10% $H_2O$ (volume) | 1.74 | 33 | 0.307 | 59.2 | 23.7 | 0.75 |
| 1.60 | 7.28[a] | 4.5 | 90% MeOH-10% $H_2O$ | 1.85 | 107 | 0.226 | 46 | 18.5 | 0.67 |

| Gas Flow | | | Solvent | Solvent | Time | Performance | | | |
|---|---|---|---|---|---|---|---|---|---|
| H₂ scfh | O₂ scfh | O₂/H₂ | Solvent Composition (volume) | Pump Rate, L/hr | Hours | H₂O₂ Molar | H₂ Selec., % | mol/ mol Pd-hr | mol/ft³-hr-psi H₂ |

$^{(a)}$Plus 34.65 scfh air

No organic peroxides precipitated upon removal of methanol. These experiments also show that high reaction rates and selectivity can be obtained in essentially nonaqueous media using non-explosive non-flammable oxygen/hydrogen feeds and an excess of noble metal catalyst.

EXAMPLE 7

The reactor described in Example 4 was charged with 500 g of 2% palladium on carbon catalyst. The solvent employed was methanol containing 0.1% by weight of formaldehyde, 100 ppm of each of sodium meta- and pyrophosphates and which was 0.025 N in sulfuric acid and 0.0013 N in hydrochloric acid. The temperature was 0° C. and the pressure 400 psig. The oxygen/hydrogen ratios were 23–30, which are outside the limits of flammability or explosion. Flow rates of hydrogen/oxygen and of solvent were increased incrementally, with the following results:

| Elapsed Time, Hrs | H₂ Flow, scfh | O₂ Flow scfh | Solvent Flow L/hr | H₂O₂ Conc., M | Selectivity, % |
|---|---|---|---|---|---|
| 13.5 | 1.52 | 35.46 | 1.7 | 0.41 | 74 |
| 33.5 | 3.31 | 91.78 | 1.7 | 0.70 | 66 |
| 58.5 | 3.31 | 91.78 | 1.7 | 0.67 | 65 |
| 67.5 | 3.31 | 91.78 | 2.6 | 0.49 | 98 |
| 73.5 | 3.31 | 91.78 | 2.6 | 0.43 | 95 |
| 84.5 | 3.92 | 117.41 | 2.5 | 0.42 | 65 |
| 93.5 | 3.92 | 117.41 | 3.5 | 0.31 | 87 |

EXAMPLE 8

Decomposition of hydrogen peroxide by 5% commercially available palladium on carbon (0.25 g in 25 ml of solution) at 27.7° C. was followed as in Example 5 in aqueous acetone systems containing hydrochloric acid and/or sulfuric acid. Results were as follows:

| Run | Solvent System Vol. % N | | | | Percent Peroxide Decomposition | | | |
|---|---|---|---|---|---|---|---|---|
| | Acetone | Water | H₂SO₄ | HCl | 5 min | 1 hr | 3 hr | 5 hr |
| A | 75 | 25 | 0.1 | 0.01 | — | 16 | 30 | 32 |
| B | 75 | 25 | — | — | 100 | — | — | — |
| C | 75 | 25 | 0.1 | — | — | 62 | 79 | 85 |
| D | 75 | 25 | — | 0.01 | — | 62 | — | — |
| E | 75 | 25 | — | 0.11 | — | 18 | 30 | 44 |

These results indicate that a system containing hydrochloric acid alone or a combination of hydrochloric acid and sulfuric acids is most effective in inhibiting the decomposition of hydrogen peroxide.

What is claimed is:

1. In the process of preparing hydrogen peroxide by contacting hydrogen and oxygen with a palladium catalyst on a solid support in the presence of a liquid medium, the improvement wherein the liquid medium is methanol without added water.

2. The process of claim 1, wherein the liquid medium is at least 0.0001 N in hydrochloric acid.

3. The process of claim 1, wherein the support for the Pd catalyst is carbon.

4. The process of claim 1, wherein the liquid medium is at least 0.0001 N in hydrochloric acid and the solid support for the palladium catalyst is carbon.

5. The process of claim 1, carried out as a continuous process.

6. The process of claim 1, wherein the liquid medium is at least 0.0001 N in each of sulfuric and hydrochloric acids.

7. The process of claim 1, wherein the medium contains 0.1–1.0% by weight of formaldehyde.

8. In the process of preparing hydrogen peroxide by contacting hydrogen and oxygen with a palladium catalyst on a solid support in the presence of a liquid medium, the improvement wherein the liquid medium is aqueous methanol containing at least 75% by volume of methanol and 0.1–1.0% by weight of formaldehyde.

9. The process of claim 8, carried out as a continuous process.

* * * * *